(12) United States Patent
Bush, Sr.

(10) Patent No.: US 6,877,794 B2
(45) Date of Patent: Apr. 12, 2005

(54) TRAILER PARTICULARLY SUITED TO HAULING CRUSHED AND FLATTENED VEHICLES

(75) Inventor: Charles Bush, Sr., Rochester Hills, MI (US)

(73) Assignee: Benlee, Inc., Romulus, MI (US)

(*) Notice: Subject to any disclaimer, the term of this patent is extended or adjusted under 35 U.S.C. 154(b) by 0 days.

(21) Appl. No.: 10/391,820

(22) Filed: Mar. 18, 2003

(65) Prior Publication Data

US 2004/0100124 A1 May 27, 2004

Related U.S. Application Data

(63) Continuation-in-part of application No. 10/352,360, filed on Jan. 27, 2003, which is a continuation-in-part of application No. 10/304,417, filed on Nov. 26, 2002.

(51) Int. Cl.[7] .............................. B60J 5/06; B62D 33/02
(52) U.S. Cl. ................................ 296/186.2; 296/183.1; 296/186.4
(58) Field of Search ......................... 296/186.2, 186.4, 296/186.5, 155, 181.3, 182.1, 183, 183.1, 83; 410/118, 129

(56) References Cited

U.S. PATENT DOCUMENTS

| | | | | |
|---|---|---|---|---|
| 3,433,470 A | * | 3/1969 | Erke ........................ | 296/182.1 |
| 3,620,564 A | * | 11/1971 | Wenger et al. ................. | 296/83 |
| 4,690,609 A | | 9/1987 | Brown | |
| 4,826,236 A | * | 5/1989 | Bennett .................... | 296/186.2 |
| 4,828,316 A | * | 5/1989 | Bennett et al. .......... | 296/186.2 |
| 4,856,843 A | | 8/1989 | Elliott | |
| 4,991,901 A | * | 2/1991 | Meekhof et al. ............... | 296/98 |
| 5,044,689 A | * | 9/1991 | Evers ....................... | 296/186.2 |
| 5,176,388 A | * | 1/1993 | Horton ........................ | 296/155 |
| 5,215,349 A | * | 6/1993 | Horton .................... | 296/186.2 |
| 5,255,952 A | | 10/1993 | Ehrlich | |
| 5,259,659 A | | 11/1993 | Inaba | |
| 5,282,663 A | * | 2/1994 | Horton ........................ | 296/155 |
| 5,320,402 A | * | 6/1994 | Evers ........................ | 296/186.2 |
| 5,466,030 A | * | 11/1995 | Harris et al. ................... | 296/98 |
| 5,599,058 A | | 2/1997 | Carter et al. | |
| 5,876,164 A | | 3/1999 | Hamelin et al. | |
| 6,152,511 A | | 11/2000 | Gustafson | |
| 6,183,036 B1 | * | 2/2001 | Coulson ................ | 296/100.13 |
| 6,325,438 B1 | | 12/2001 | Anderson | |
| 6,375,248 B1 | | 4/2002 | Bergstrom | |
| 6,513,862 B2 | | 2/2003 | Dodson et al. | |
| 6,543,827 B2 | | 4/2003 | Miller | |

* cited by examiner

Primary Examiner—D. Glenn Dayoan
Assistant Examiner—Greg Blankenship
(74) Attorney, Agent, or Firm—Gifford, Krass, Groh, Sprinkle, Anderson & Citkowski, PC

(57) ABSTRACT

This invention broadly provides a trailer having a side which opens and closes to prevent the loss of material during transport. In the preferred embodiment, the trailer includes three solid or rigid sides with a fourth side that opens and closes with a drape, though in alternative configurations, two or more sides may also open and close, preferably utilizing the methods and apparatus disclosed herein. In a simple configuration, the invention utilizes a cable suspended between opposing upper points, with a curtain having upper eyelets journaled thereon, enabling the curtain to open and close so as to permit access to the trailer interior. Although this may be carried out according to the invention with an upper cable that remains affixed, in the preferred embodiments, a winch and pulley system is used to tighten the cable, and to loosen the cable for detachment purposes. As a further refinement, a door composed of structural members is utilized, preferably toward the rear of the trailer, this door-like feature including an upper tube through which the cable extends, enabling the curtain to be retracted onto the tube, and the door folded over the back of the trailer to keep the closure out of the way during access to the trailer bed. The curtain or drape may be made from various materials, including a vertical louvers, chain-link, and the like, though the preferred material is a mesh with small openings similar or identical to that used in commercial tennis net construction.

9 Claims, 4 Drawing Sheets

TRAILER PARTICULARLY SUITED TO HAULING CRUSHED AND FLATTENED VEHICLES

REFERENCE TO RELATED APPLICATIONS

This application is a continuation-in-part of U.S. patent application Ser. No. 10/352,360, filed Jan. 27, 2003, which is a continuation-in-part of U.S. patent application Ser. No. 10/304,417, filed Nov. 26, 2002, the entire content of each of which are incorporated herein by reference.

FIELD OF THE INVENTION

This invention relates generally to waste and scrap hauling and, in particular, to a trailer with four sides, at least one of which opens to receive scrap such as crushed/flattened vehicles.

BACKGROUND OF THE INVENTION

The recycling of wrecked cars now represents a substantial business. Such vehicles are first stripped of non-metal parts and hazardous materials, then crushed or flattened to consume less space during transport to a recycling station where they are chipped into small pieces. The small pieces are then sold to be melted down.

Standard flatbed trailers are commonly used to transport the crushed or flattened vehicles. The flattened vehicles are typically loaded on the flatbed in stacks using a forklift, and each stack is secured with tie-down chains.

There are disadvantages associated with the use of flatbed trailers, however. For one, when the wrecked vehicles are crushed or flattened, stress is put on various parts such as mirrors and moldings that may become dislodged or loose in transit, resulting in dangerous debris on the highway. Another disadvantage is that if the load has shifted, adjustments should be made to the tie-downs, which are difficult to inspect and secure. Manipulating the chains across the stacks can be unsafe, as the stacks of vehicles are unstable and are prone to slip or tip over.

Various alternative trailers are used to overcome these disadvantages. A common approach is the use of a three-sided trailer of the type disclosed, for example, in U.S. Pat. No. 5,599,058. A twelve-foot high retainer wall of solid sheet steel is also provided on the three walled sides around the bottom periphery to prevent any small pieces of debris from falling off the trailer bed on those sides. The open side of the trailer is located on the side of the transport vehicle that will be toward the berm of the road, so that any debris failing in that direction will fall to the side of the road.

In accordance with U.S. Pat. No. 5,876,164, there is provided a device for carrying car frames or the like, comprising a rectangular base member comprising at least one trailer bed, and means for mounting said base member on wheels. Transverse members are spacedly mounted on the base member and a first vertical protection wall is mounted at a front end of the base member. A second vertical protection wall is mounted on one longitudinal side of the base member, the other longitudinal side being free of vertical protection wall, and a third vertical protection wall is mounted at a rear end of the base member. Support means extend vertically from the transverse member and are aligned along a straight line spaced at an equal distance from the second protection wall. A non-slip member is disposed along the other longitudinal side of the base member, and means for securing a load of car frames are stacked on the transverse members between the support means and the non-slip members.

In accordance with a preferred embodiment, the base member comprises a front trailer bed and a rear trailer bed, the rear trailer bed being articulated to the front trailer bed, the first vertical protection wall being mounted at the front of the front trailer bed, the third vertical protection wall being mounted at the rear of the rear trailer bed, the second vertical protection wall being mounted on the longitudinal left sides of both front and rear trailer beds.

Despite advances of the type described above, the need remains for a trailer with a fourth side that opens and closes. In the United States, this need has increased in urgency due to a recently enacted law requiring that all four sides of car frame haulers be enclosed at least up to the level of the load.

SUMMARY OF THE INVENTION

This invention broadly provides a trailer having a side which opens and closes to prevent the loss of material during transport. In the preferred embodiment, the trailer includes three solid or rigid sides with a fourth side that opens and closes with a drape, though in alternative configurations, two or more sides may also open and close, preferably utilizing the methods and apparatus disclosed herein.

In a simple configuration, the invention utilizes a cable suspended between opposing upper points, with a curtain having upper eyelets journaled thereon, enabling the curtain to open and close so as to permit access to the trailer interior. Although this may be carried out according to the invention with an upper cable that remains affixed, in the preferred embodiments, a winch and pulley system is used to tighten the cable, and to loosen the cable for detachment purposes.

As a further refinement, a door composed of structural members is utilized, preferably toward the rear of the trailer, this door-like feature including an upper tube through which the cable extends, enabling the curtain to be retracted onto the tube, and the door folded over the back of the trailer to keep the closure out of the way during access to the trailer bed. The curtain or drape may be made from various materials, including a vertical louvers, chain-link, and the like, though the preferred material is a mesh with small openings similar or identical to that used in commercial tennis net construction.

DETAILED DESCRIPTION OF THE INVENTION

Figure 1:
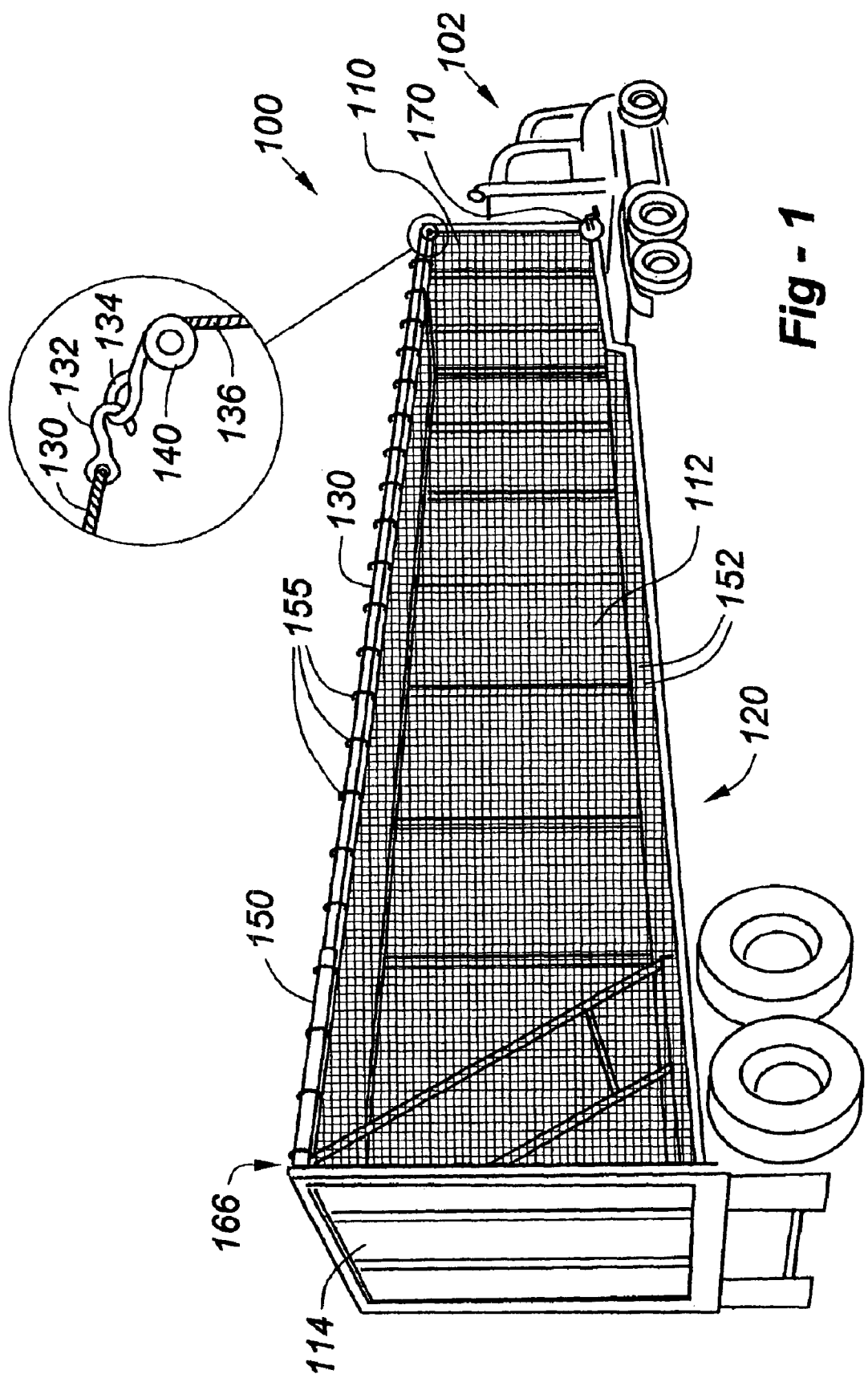
FIG. 1 is an oblique drawing of a trailer constructed in accordance with a preferred embodiment of the invention with a curtain closing off an elongated side.

Reference is now made to the drawings, wherein FIG. 1 illustrates, from an oblique perspective, a preferred embodiment of the invention shown generally at 100, which is pulled by a tractor 102 of any appropriate design. Additionally, although the trailer 100 is shown as having a certain configuration and/or dimensions to be gleaned from the illustration, the invention is not limited in this regard, and may be used with any size or type of hauling configuration, regardless of the way in which it is pulled. Also, although the description to follow is directed to a curtain that opens and closes with respect to a single side, will be appreciated that the apparatus and technique may be used for the opposing elongated side or other walls of the container as convenient for loading/unloading purposes.

Broadly, the trailer 100 includes cable 130 suspended between an upper point toward the front wall 110 of the trailer and an upper point associated with the rear wall 114. Suspended from this cable 130 is a curtain 152, preferably through the use of eyelets 155. Though not evident in the drawing, preferred embodiments further include attachment devices such as shock cords at the front, rear and/or bottom to hold the curtain 152 in place, particularly during transport on highways.

Although different materials may be used for the curtain 152, such as thin vertical slats or louvers, chain or chain-link mesh, or solid fabric such as fiber-reinforced plastics, in the preferred embodiment, a mesh material akin to that used for tennis net construction is used, this offering a practical compromise in terms of weight, and the ability to keep loose components contained while not being susceptible to wind capture.

Although the simplest embodiment may use a fixed cable strung between two upper points on a permanent or semi-permanent basis, with a curtain suspended therefrom, in the preferred embodiment of the invention, additional features are added to facilitate a more convenient and effective retraction of the curtain. For one, the upper end of the cable 130 is preferably journaled over a pulley 140, with the remaining length 136 of the cable 130 extending down to a manually-operated winch 160, enabling the cable to be tightened for greater stability. The winch 170 may also be used to loosen the cable, and with the optional addition of a connector comprising, for example, a hook 132 and eyelet 134, the cable 130 may be detached from cable 136 for stowage purposes. As a further refinement, a structural door comprising an upper tube 150 and strengthening members 160 may be provided, enabling the curtain 152 to be drawn thereon and folded out of the way, as explained in further detail below.

Figure 2:
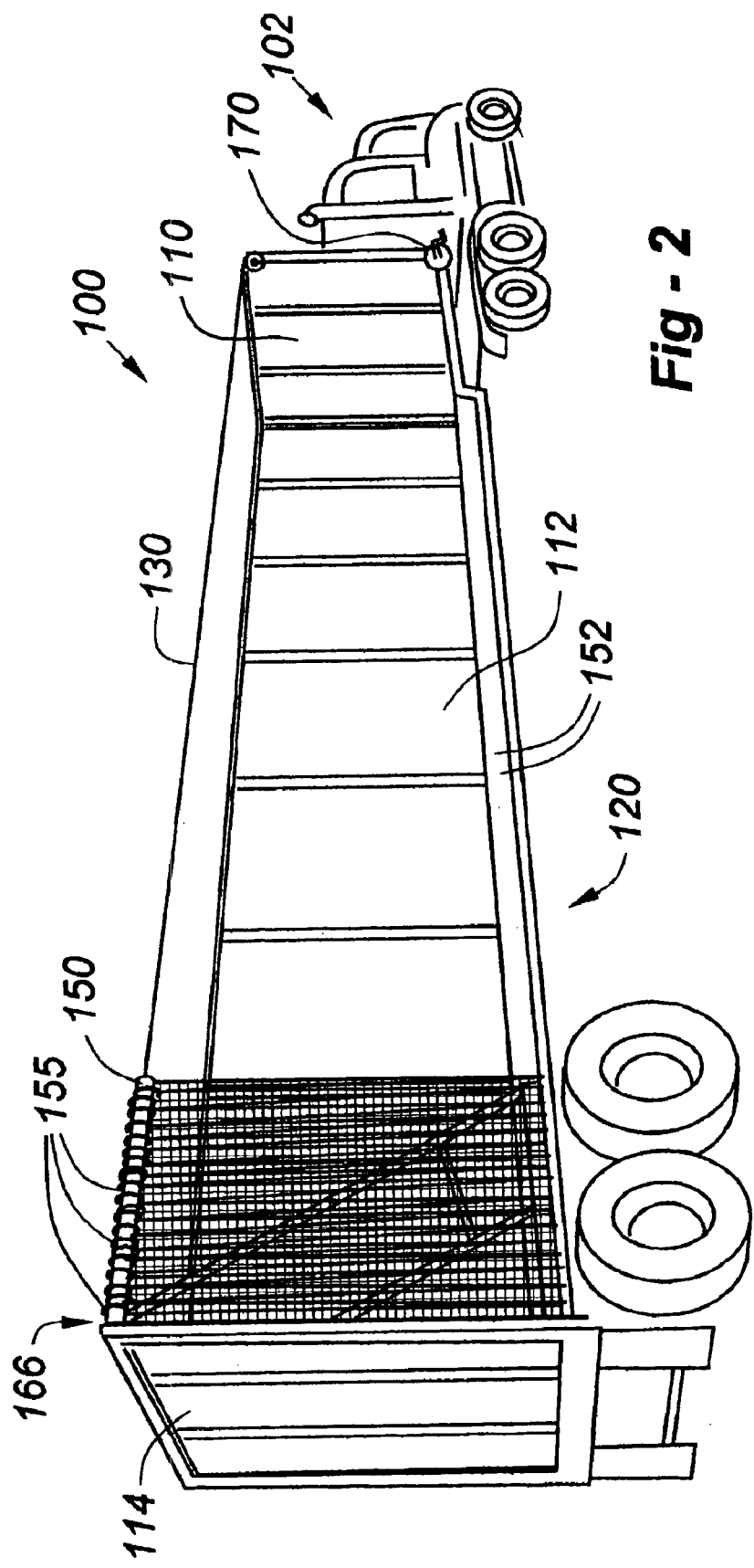
FIG. 2 is a drawing which shows an initial step associated with retracting the curtain.
Figure 3:
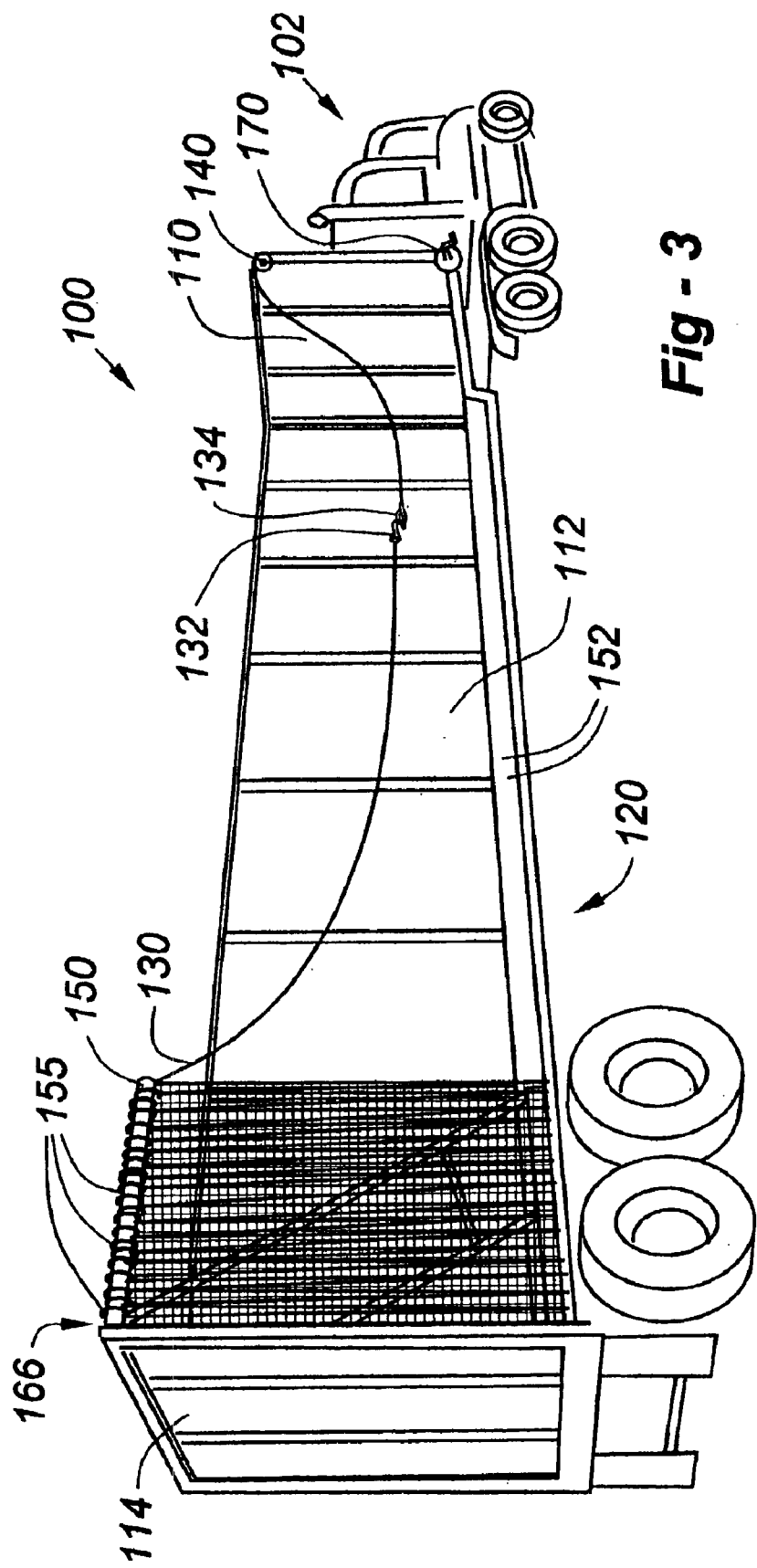
FIG. 3 is a drawing which shows yet a further step associated with curtain retraction.

FIG. 2, for example, illustrates a first step associated with retracting the curtain 152 according to a preferred embodiment of the invention. In particular, the curtain is detached as necessary and retracted such that all the eyelets 155 are now journaled over the tube 150. When this is done, the cable 130 may be loosened using winch 170, as shown in FIG. 3, enabling an operator to disconnect the cable at hook 132 and eyelet 134. The detached cable 130 may either be manually dressed or with respect to the retracted curtain 152 or, a separate winch (not shown) may be used to withdraw some or all of the cable 130 into the tube 150.

Figure 4:
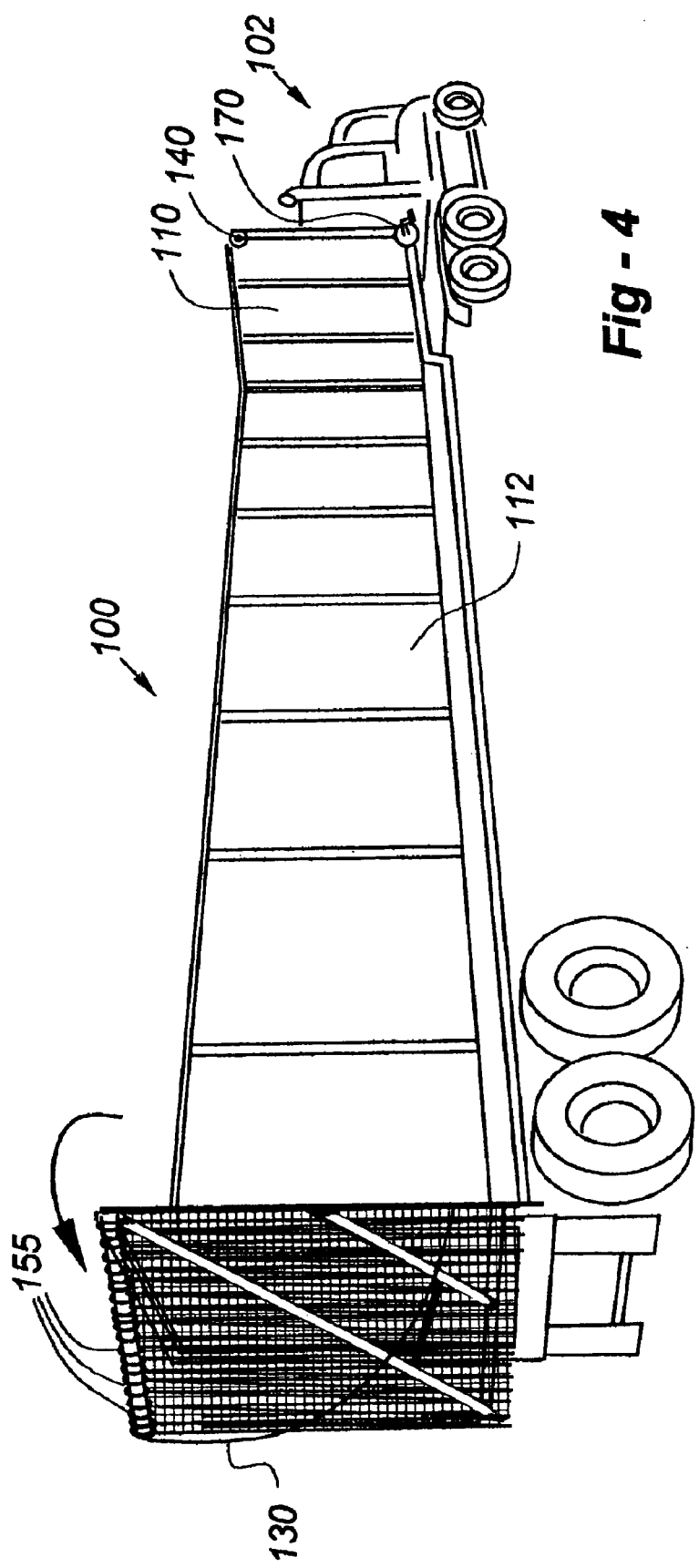
FIG. 4 is a drawing which shows the preferred use of a door assembly including an upper tube, allowing the retracted curtain to be folded onto the back wall of the trailer when not in use.

Once the curtain 152 and cable 130 are properly stowed relative to the door structure, it is swung backward on hinge 166, enabling it to be folded onto the back wall of the trailer, and out of the way, thereby enabling greater access to the cargo area, as shown in FIG. 4.

I claim:

1. A trailer with a set of wheels for hauling crushed cars and other scrap, comprising:
    a floor having a front edge, a back edge and two side edges;
    a front wall extending up from the front edge and a back wall extending up from the back edge defining an interior with an open side, the front wall having an upper point defining a forward, upper corner of the open side, and the back wall having an upper point defining a rearward, upper corner of the open side;
    a cable spanning the upper forward and rearward points; and
    a flexible mesh curtain suspended from the cable, the curtain having a retracted condition where in the interior is accessible through the open side for trailer loading and unloading, and an expanded condition wherein the open side is closed off for transport.

2. The trailer of claim 1, further including a winch for maintaining the cable in a taut condition.

3. The trailer of claim 1, further including a hinged structure having a rigid upper member enabling the curtain to be retracted onto the member and the structure folded out of the way for improved access to the interior of the trailer.

4. The trailer of claim 3, wherein the rigid, upper member is a tube into which the cable extends.

5. The trailer of claim 4, further including a mechanism for drawing the cable into the tube.

6. The trailer of claim 3, the hinged structure folds onto the back wall of the trailer.

7. The trailer of claim 1, wherein the cable further includes a connector enabling the cable to be disconnected in a non-taut condition.

8. A trailer with a set of wheels for hauling crushed cars and other scrap, the trailer consisting essentially of:
    a floor having a front edge, a back edge and two side edges;
    a front wall extending up from the front edge and a back wall extending up from the back edge defining an interior with an open side, the front wall having an upper point defining a forward, upper corner of the open side, and the back wall having an upper point defining a reward, upper corner of the open side;
    a cable spanning the upper forward and rearward points;
    a flexible mesh curtain suspended from the cable, the curtain having a retracted condition where in the interior is accessible through the open side for trailer loading and unloading, and expanded condition wherein the open side is closed off for transport; and
    a winch for maintaining the cable in a taut condition.

9. A trailer with a set of wheels for hauling crushed cars and other scrap, the trailer consisting essentially of:
    a floor having a front edge, a back edge and two side edges;
    a front wall extending up from the front edge and a back wall extending up from the back edge defining an interior with an open side, the front wall having an upper point defining a forward, upper corner of the open side, and the back wall having an upper point defining a rearward, upper corner of the open side;
    a cable spanning the upper forward and rearward points;
    a curtain suspended from the cable, the curtain having a retracted condition wherein the interior is accessible through the open side for trailer loading and unloading, and an expanded condition wherein the open side closed off for transport; and
    a hinged structure having a rigid upper member enabling the curtain to be retracted onto the member and the structure folded out of the way for improved access to the interior of the trailer.

* * * * *